United States Patent [19]

Gaboury et al.

[11] Patent Number: 5,394,217
[45] Date of Patent: Feb. 28, 1995

[54] METHOD AND APPARATUS FOR DETERMINING LINE FREQUENCY AND DETECTING VARIABLE FREQUENCY LIGHT SOURCES

[75] Inventors: Michael J. Gaboury, Spencerport; J. David Cocca, Pittsford, both of N.Y.

[73] Assignee: Eastman Kodak Company, Rochester, N.Y.

[21] Appl. No.: 127,933

[22] Filed: Sep. 27, 1993

[51] Int. Cl.⁶ .............................................. G03B 7/08
[52] U.S. Cl. ..................................... 354/430; 356/218
[58] Field of Search ........................................ 354/430

[56] References Cited

U.S. PATENT DOCUMENTS

| | | | |
|---|---|---|---|
| 3,850,530 | 11/1974 | Uno et al. | 354/430 |
| 4,041,308 | 8/1977 | Fujita | 354/430 |
| 4,079,388 | 3/1978 | Takahama et al. | 354/31 |
| 4,117,502 | 9/1978 | Takeda et al. | 354/106 |
| 4,129,366 | 12/1978 | Watanabe | 354/430 |
| 4,182,560 | 1/1980 | Oguchi et al. | 354/106 |
| 4,220,412 | 9/1980 | Shroyer et al. | 354/430 |
| 4,258,993 | 3/1981 | Frank | 354/60 A |
| 4,319,133 | 3/1982 | Currie et al. | 250/214 B |
| 4,340,286 | 7/1982 | Carr | 354/105 |
| 4,464,049 | 8/1984 | Schroeder | 356/218 |
| 4,511,229 | 4/1985 | Schwartz et al. | 354/20 |
| 4,914,738 | 4/1990 | Oda et al. | 356/419 |
| 4,989,093 | 1/1991 | Kaneko | 358/213.19 |
| 5,016,030 | 5/1991 | Dwyer et al. | 354/21 |
| 5,016,039 | 5/1991 | Sosa et al. | 354/430 |
| 5,037,198 | 8/1991 | Gaboury | 356/218 |
| 5,087,936 | 2/1992 | Ogata et al. | 354/430 |
| 5,128,708 | 7/1992 | Murayama et al. | 354/430 |
| 5,130,745 | 7/1992 | Cloutier et al. | 355/40 |

Primary Examiner—Russell E. Adams
Attorney, Agent, or Firm—Francis H. Boos

[57] ABSTRACT

A line frequency is determined by interleaved sampling of ambient light to obtain analog voltage samples at predetermined sampling rates associated with two or more line frequencies. Where there are two line frequencies, one method separates the first samples by a time period at least equal to an analog-to-digital conversion time, and less than the earliest time when a sample associated with one line frequency would coincide with a sample from the other. There are n samples per flicker frequency period and Q samples for each line frequency are taken. In a second method, a first common sample is taken for all line frequencies, and a condition characterized by simultaneous samples for different line frequency sample groups triggers a common sample for all line frequencies. For both methods, digital sample values one through Q-1 for each group are operated on to obtain a result, and then two through Q are similarly operated on to obtain a second result. The result for samples one through Q-1 for a given line frequency is compared to the result for samples two through Q. If the results for a given line frequency are within a predetermined limit, the presence of that line frequency is indicated. The known line frequency can be used to set the light sampling rate for exposure setting, as well as imprinting light source information onto photographic film.

29 Claims, 13 Drawing Sheets

METHOD AND APPARATUS FOR DETERMINING LINE FREQUENCY AND DETECTING VARIABLE FREQUENCY LIGHT SOURCES

BACKGROUND OF THE INVENTION

1. Technical Field

The present invention generally relates to determining line frequency. More particularly, the present invention relates to determining a line frequency presence and detecting a variable frequency artificial light source.

2. Background Art

In the past, various illuminant discrimination techniques have been used to determine the type of lighting present, for example, in a photographic scene. This information is useful to the photo developer for proper color correction, since different types of lighting cause different tinting of photos. Illuminant discrimination techniques exist not only to determine whether the light source is either natural or artificial, but also to determine among various types of artificial light, such as tungsten and fluorescent. If the lighting is artificial, the accuracy of these illuminant discrimination techniques may be adversely affected if the light samples are taken at a rate different from the line frequency of the artificial light source. Since line frequencies differ among countries, accuracy in the use of these artificial light discrimination techniques may be affected when traveling between countries.

Knowing the line frequency of an artificial light source would also be helpful in exposure setting techniques for cameras. If the line frequency is different from the light sampling rate for determining the correct exposure setting, light flickering can cause a light sample to be improperly interpreted, leading to an improper exposure setting. Thus, if the line frequency were known, light samples could be taken at the line frequency to avoid improper exposure due to flickering.

Thus, a need exists for determining a line frequency and a presence of a variable frequency artificial light source.

SUMMARY OF THE INVENTION

Briefly, the present invention satisfies the need to determine line frequency and the presence of artificial light sources by providing line frequency determination methods and apparatus, as well as further uses for the determined line frequency.

A first method is provided for determining the presence of a line frequency from a group of possible line frequencies. The group of possible line frequencies includes a first line frequency having an associated first flicker frequency period and a second line frequency, which is lower than the first line frequency, having an associated second flicker frequency period. Analog voltage samples representing ambient light level for a first sample group corresponding to the first line frequency are taken at a first sample rate, and analog voltage samples representing ambient light level for a second sample group corresponding to the second line frequency are taken at a second sample rate. The sample rates are defined by:

sample rate = $1/(f_f \times n)$, where $f_f$ = flicker frequency in Hertz, and n = number of samples per flicker frequency period.

Sampling is done to obtain a first analog voltage sample for the first sample group, which is converted to digital form. Then, a first analog voltage sample for the second sample group is taken and converted to digital form after a predetermined time. The predetermined time is at least equal to a time required for analog-to-digital converting and less than a shortest time where a future sample of the first sample group would coincide with a future sample of the second sample group at the respective sample rates. A second sample for the first sample group at the first sample rate and a second sample for the second sample group at the second sample rate are then taken and converted. The sampling continues for each group at the respective sample rate until a predetermined number of samples Q for each sample group are taken and converted. Converted samples in at least one sample group are then compared to determine if a presence of the associated line frequency is indicated.

In one comparison approach, Q is at least equal to five. A value derived from samples one through Q-1 of a given sample group is compared to a value derived from samples two through Q of the same group. If the two values are within a predetermined limit of each other, the line frequency associated with that sample group is present.

A second method is provided for determining the presence of a line frequency from a group of at least two possible line frequencies. Each line frequency has an associated flicker frequency period and an associated sample group. Sampling is done to obtain a common first analog voltage sample representative of ambient light level for all sample groups, the common sample then being converted to a digital value. Consecutive analog voltage samples are taken and converted for each sample group at a sample rate defined as in the first method. Sampling and converting for each sample group continues at the respective sample rate until a predetermined number of samples Q are taken and converted therefor. A presence of a condition characterized by sampling for more than one sample group coinciding is determined and a common sample is taken and converted for the more than one sample group in response thereto. As in the first method, the samples in at least one sample group are compared to determine if a presence of the associated line frequency is indicated.

A line frequency determination device is also provided for determining the presence of a line frequency by implementing the methodologies described above.

The present invention also contemplates using the determined line frequency to set the light level sampling rate for cameras with automatic exposure setting. In addition, the line frequency information can be used to imprint a light source message onto photographic film.

These, and other objects, features and advantages of this invention will become apparent from the following detailed description of the various aspects of the invention taken in conjunction with the accompanying drawings.

BEST MODE FOR CARRYING OUT THE INVENTION

The standard line frequency in the U.S. is 60 Hertz, while in many foreign countries it is 50 Hertz. Thus, the description of the present invention will focus on determining whether a 50 or a 60 Hertz line frequency is indicated as providing power to a variable frequency artificial light source, as well as further uses for the known line frequency. However, it will be understood that the present invention is useful with any number of different possible line frequencies.

Figure 1:
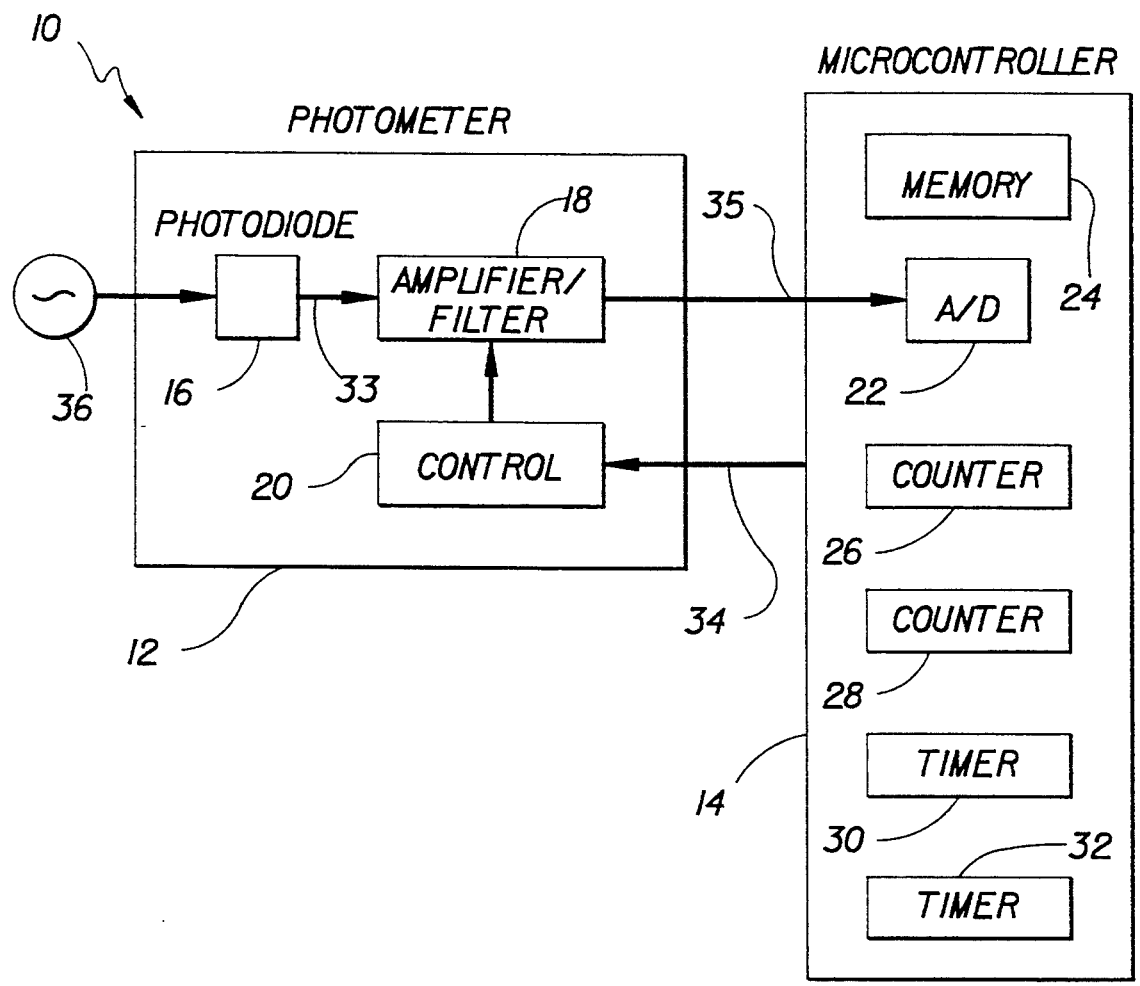
FIG. 1 is a block diagram representation of circuitry for line frequency determination according to the present invention.

FIG. 1 depicts, in block diagram form, line frequency determination circuitry 10 that can be used to practice the present invention. It will be understood that circuitry 10 is merely one example of how the present invention could be implemented. Circuitry 10 comprises photometer 12 and general purpose microcontroller 14, commonly available equipment in the field. Photometer 12 includes photodiode 16, amplifier/filter circuitry 18 and control circuitry 20. Microcontroller 14 includes analog-to-digital converter (A/D converter) 22, memory 24, counters 26 and 28, and timers 30 and 32. In accordance with commands over line 34 from microcontroller 14 to photometer control circuitry 20, photodiode 16 samples ambient light 36 to produce an analog voltage (hereinafter referred to as an "analog voltage sample") representative of the light level. The analog voltage sample is sent to amplifier/filter circuitry 18 over line 33; the output of circuitry 18 is then sent to A/D converter 22 over line 35. A/D converter 22 on board microcontroller 14 converts the filtered and amplified analog voltage sample to digital form. Certain operations, which will subsequently be described in further detail, performed on the digital samples by microcontroller 14 determine if a 50 Hertz line frequency is present, a 60 Hertz line frequency is present, if both line frequencies are present (i.e., more than one) or if no line frequency is present. As one skilled in the art would know, appropriately programmed microcontroller 14 could be replaced by, for example, an application specific integrated circuit.

Figure 2:
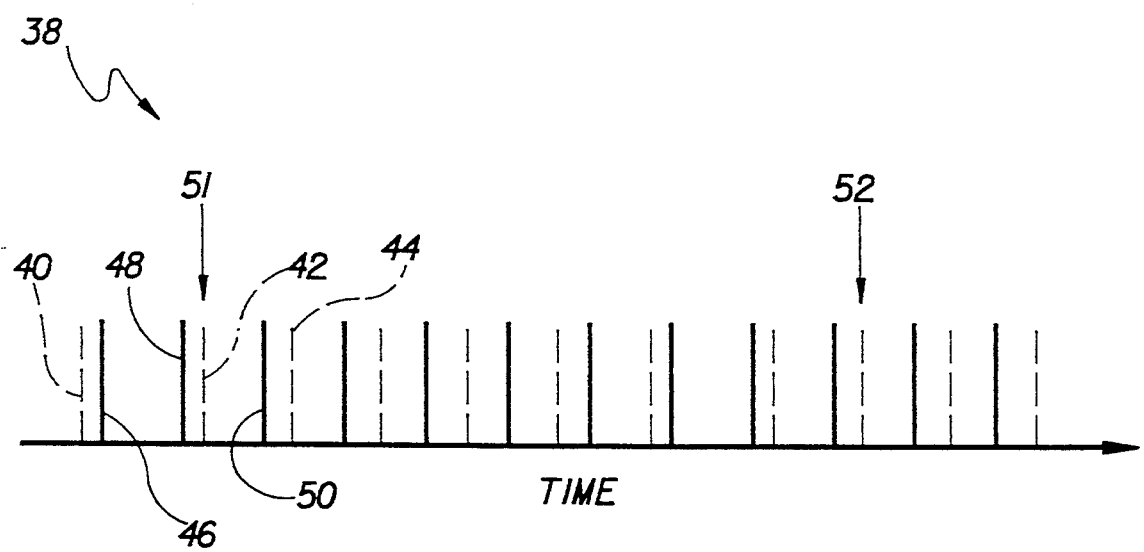
FIG. 2 is a light sample timing diagram for use with the line frequency determination circuitry of FIG. 1 according to a first method of the present invention.

FIG. 2 is a light sample timing diagram 38 that will be used to describe interleaved light sampling used in line frequency determination according to the first method of the present invention. Interleaved light sampling according to the first method minimizes the time needed to take the necessary samples without allowing any samples to coincide. Interleaved light sampling is most useful where only one A/D converter, such as A/D converter 22 in FIG. 1, is used for line frequency determination. The dashed lines in FIG. 2, e.g., 40, 42 and 44, represent light samples in a sample group that will be compared to determine if the line frequency present is 50 Hertz. The solid lines, e.g., 46, 48 and 50, represent light samples in a sample group that will be compared to determine if the line frequency present is 60 Hertz.

The time between successive light samples for a given sample group (hereinafter, the "sample rate") is determined by the following:

sample rate = $1/(f_f \times n)$, where $f_f$ = flicker frequency in Hertz, and n = number of samples per flicker frequency period.

For artificial lighting, the light intensity increases every half cycle of line frequency, creating a light intensity flicker effect having a frequency (hereinafter referred to as the "flicker frequency") of twice the line frequency. At second sample position 51, the 50 Hz samples begin to "fall behind" the 60 Hz samples. This results in a longer period of time needed to take the same number of 50 Hz samples as the 60 Hz samples. For example, at sample position 52, ten 60 Hz samples have been taken, while only nine 50 Hz samples have been taken. Thus, the lower the line frequency, the longer it will take to obtain the same number of samples. In the presently preferred embodiment, eight samples are taken per flicker frequency period. Thus, for a line frequency of 50 Hertz (i.e., a flicker frequency of 100 Hz), the sample rate is 1.25 ms, and for a line frequency of 60 Hertz (i.e., a flicker frequency of 120 Hz), the sample rate is 1.04167 ms.

At present, nine samples for each possible line frequency in a preferred comparison approach are considered to be the minimum number providing a comfortable level of accuracy without unduly extending the sampling time. However, the preferred comparison approach will theoretically work with five samples for each line frequency. As can be seen from FIG. 2, the time for taking nine or more samples for all sample groups is dictated by the lowest frequency sample rate, in this case, 50 Hertz. The time between the first 50 and 60 Hertz sample (hereinafter, the "stagger time") is chosen such that no 50 and 60 Hertz samples will coincide. This could be determined, for example, by generating time lines such as that of FIG. 2, for increasing times from the conversion time until a proper stagger time is determined. In addition, since the total time for taking all samples is dictated by the sample rate for the 50 Hertz samples, the time between the first 50 and 60 Hertz sample could be maximized without affecting the total sampling time required. In the present case, the maximum time without overlap of samples is about 104 $\mu$s. A simpler sample-taking approach would be to take all samples for each line frequency sample group, then all samples for another. However, this would dramatically increase the total sampling time.

If an A/D converter and photometer for each line frequency tested were available, the samples could be taken independently. However, that would increase both the cost of production, by increasing the number of elements, and the amount of space needed for the line frequency determination circuitry.

Figure 3:
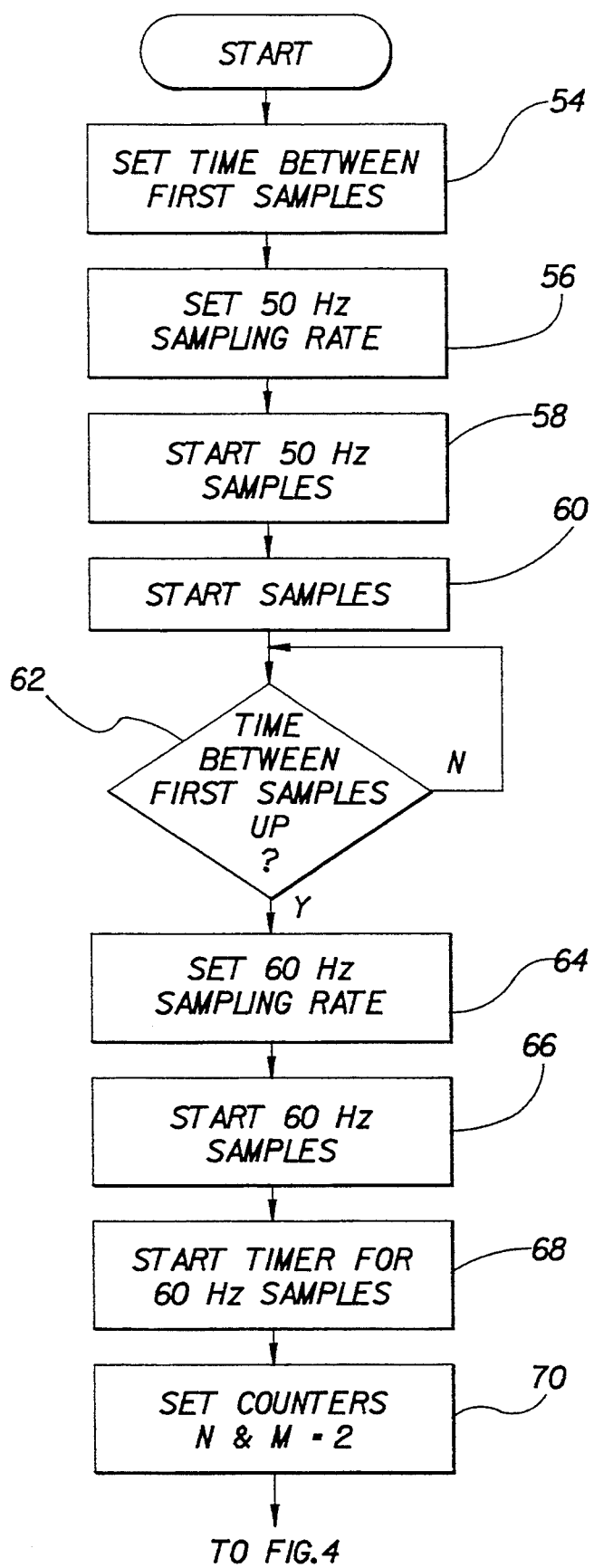
FIGS. 3, 4 and 5 comprise a flow diagram depicting the first line frequency determination method for two possible line frequencies according to the present invention.

FIG. 3 and the accompanying FIGS. 4 and 5 comprise a flow diagram depicting a first method for determining a line frequency and light source according to the present invention, which will now be described with reference to the line frequency determination circuitry 10 of FIG. 1.

Figure 4:
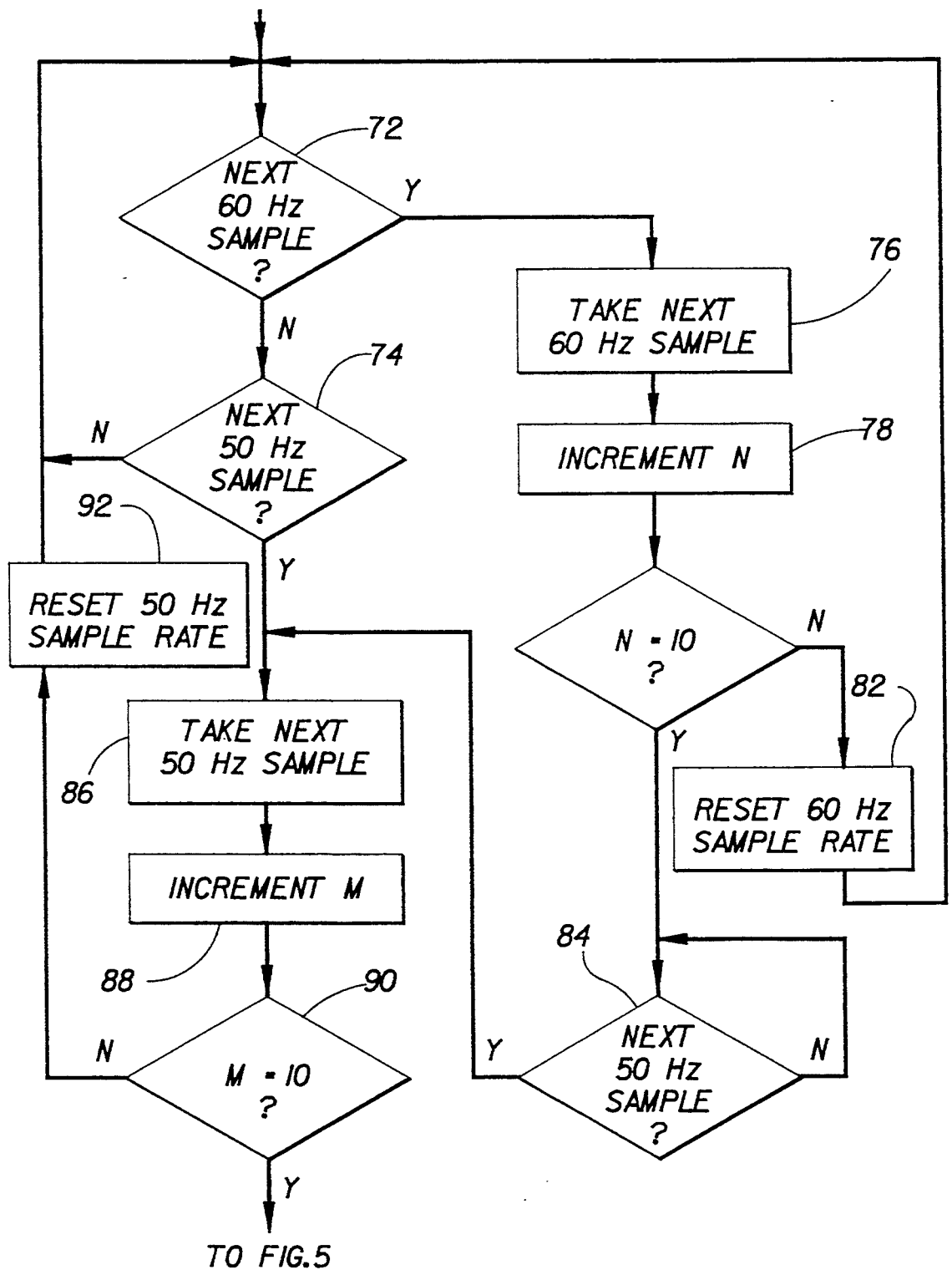
Figure 5:
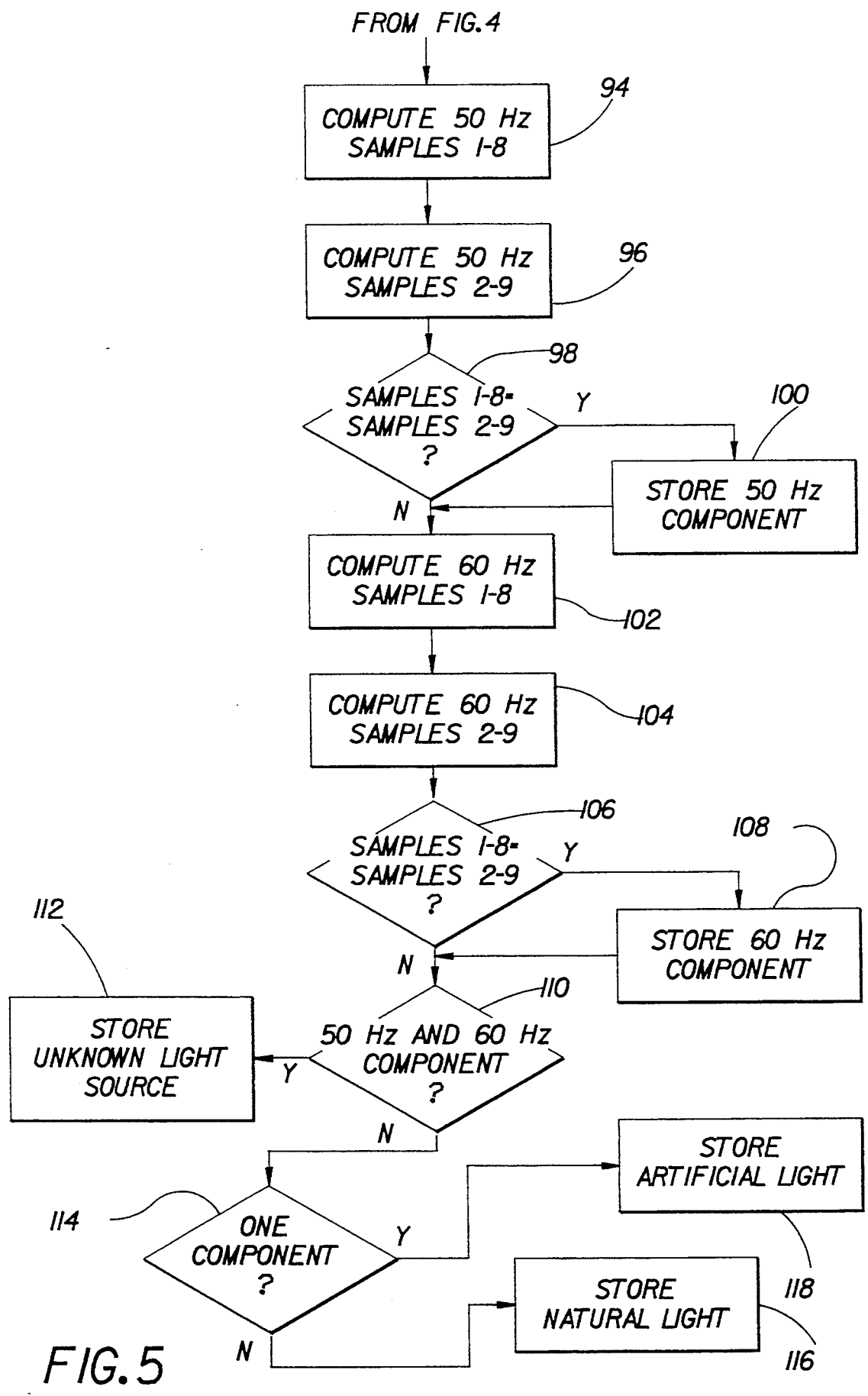

The method depicted in FIGS. 3, 4 and 5 begins by setting timer 30 to 104 μs for the delay between the first 50 and 60 hz samples (STEP 54 "SET TIME BETWEEN FIRST SAMPLES"). The maximum separation time of 104 μs was arrived at by finding the difference between the sample rates for the 50 and 60 hz sample groups, and dividing that difference by two. As previously described, timer 30 is set to the maximum time between first samples, without allowing the samples to coincide on time line 38. Although the minimum time that timer 30 could be set to time is dictated by the speed of A/D converter 22, the total time for taking samples is dictated by the time between 50 Hz samples. Thus, no overall sampling time is saved by setting the timer to the lower limit of the A/D converter. Timer 32 controls the 50 Hz sample rate and is set to 1.25 ms (STEP 56 "SET 50 HZ SAMPLE RATE"). After both timers are initialized, the first 50 Hz sample is taken (STEP 58 "START 50 HZ SAMPLES").

Simultaneous with the taking of the first 50 Hz sample, both timers are started (STEP 60 "START TIMERS"). An inquiry as to whether timer 30 has timed out is repeatedly made until it has timed out (INQUIRY 62 "TIME BETWEEN FIRST SAMPLES UP?"). After timer 30 has timed out, indicating that the time between the first 50 and 60 Hz samples is up, timer 30 is reset to 1.04 ms to control the 60 Hz sample rate (STEP 64 "SET 60 HZ SAMPLING RATE"). The first 60 Hz sample is then taken and converted (STEP 66 "START 60 HZ SAMPLES") and timer 30 is simultaneously started (STEP 68 "START TIMER FOR 60 HZ SAMPLES"). Counters 26 and 28 are then each initialized to 2 (STEP 70 "SET COUNTERS N & M=2"). A loop is then entered wherein two inquiries are made. A first inquiry is made as to whether timer 30 has timed out (INQUIRY 72 "NEXT 60 HZ SAMPLE?"). If timer 30 has not timed out, the second inquiry of the loop is made as to whether timer 32 has timed out (INQUIRY 74 "NEXT 50 HZ SAMPLE?"). If timer 32 has not timed out, inquiries 72 and 74 are repeated until one of the timers times out.

When timer 30 times out, the next 60 Hz sample is taken (STEP 76 "TAKE NEXT 60 HZ SAMPLE"), and counter 26 is incremented (STEP 78 "INCREMENT N"). An inquiry is then made as to whether counter 26 has reached ten, i.e., whether nine samples have been taken for the 60 H sample group (INQUIRY 80 "N=10?"). If counter 26 has not yet reached ten, the timer for 60 Hz samples is reset to 1.04 ms and started (STEP 82 "RESET 60 HZ SAMPLE RATE"), after which timer inquiry loop 72, 74 is returned to.

If counter 26 has reached ten, an inquiry is made as to whether timer 32 has timed out (INQUIRY 84 "NEXT 50 HZ SAMPLE?"). INQUIRY 84 is repeated until timer 32 has timed out, at which time the next 50 hz sample is taken (STEP 86 "TAKE 50 HZ SAMPLE") and counter 28 is incremented (STEP 88 "INCREMENT M"). An inquiry is then made as to whether all the 50 HZ samples have been taken (INQUIRY 90 "M=10?"). If counter 28 has not yet reached 10, timer 32 is reset and started for the next 50 hz sample (STEP 92 "RESET 50 HZ SAMPLE RATE"), and timer inquiry loop 72, 74 is returned to. If counter 28 has reached ten, then samples 1-9 of both the 50 and 60 hz sample groups have been taken. A value indicative of a line frequency is then computed from samples 1-8 of one sample group, in this case the 50 hz sample group is chosen (STEP 94 "COMPUTE 50 HZ SAMPLES 1-8"). Note that this value can be arrived at using the teachings of U.S. Pat. No. 5,037,198, issued to Gaboury, entitled "Illuminant Discriminator with Improved Boundary Conditions", (hereinafter "the Gaboury patent") filed on Jul. 16, 1990, and assigned to the Eastman Kodak Company, which is herein incorporated by reference in its entirety. A value for samples 2-9 of the 50 hz sample group is similarly arrived at (STEP 96 "COMPUTE 50 HZ SAMPLES 2-9"). If the resulting values are within a predetermined limit of each other (INQUIRY 98 "SAMPLES 1-8=SAMPLES 2-9?"), the presence of a 50 hz line frequency is indicated. If the values are within the predetermined limit of each other, an indication of a 50 hz component is stored in memory 24 (STEP 100 "STORE 50 Hz COMPONENT"). Whether or not the values are within the predetermined limit of each other, the same operations are performed on samples 1-8 and 2-9 of the other sample group, in this case the 60 hz sample group (STEP 102 "COMPUTE 60 HZ SAMPLES 1-8" and STEP 104 "COMPUTE 60 HZ SAMPLES 2-9"). As with the previous sample group, if the resultant values are within a predetermined limit of each other (INQUIRY 106 "SAMPLES 1-8=SAMPLES 2-9?") an indication of the presence of a 60 hz component is stored in memory 24 (STEP 108 "STORE 60 HZ COMPONENT").

At this point, one, both or no line frequency has been determined. The remainder of the method determines the light source based on the results of the line frequency determination. An inquiry is made as to whether both a 50 and a 60 hz component was detected (INQUIRY 110 "50 AND 60 HZ COMPONENT?"). If both components were found, an indication of the light source as unknown is stored in memory 24 (STEP 112 "STORE UNKNOWN LIGHT SOURCE"). If both components were not found, it is determined whether one or neither was found. Thus, an inquiry is made as to whether a single line frequency was determined (INQUIRY 114 "ONE COMPONENT?"). If neither a 50 hz component nor a 60 hz component was found, an indication of natural light is stored in memory 24 (STEP 116 "STORE NATURAL LIGHT"). If a single component was found, an indication of artificial light is stored in memory 24 (STEP 118 "STORE ARTIFICIAL LIGHT"). The teachings of the Gaboury patent could be used at this point to further determine if the artificial lighting is fluorescent, tungsten or an unknown type of artificial lighting.

Figure 6:
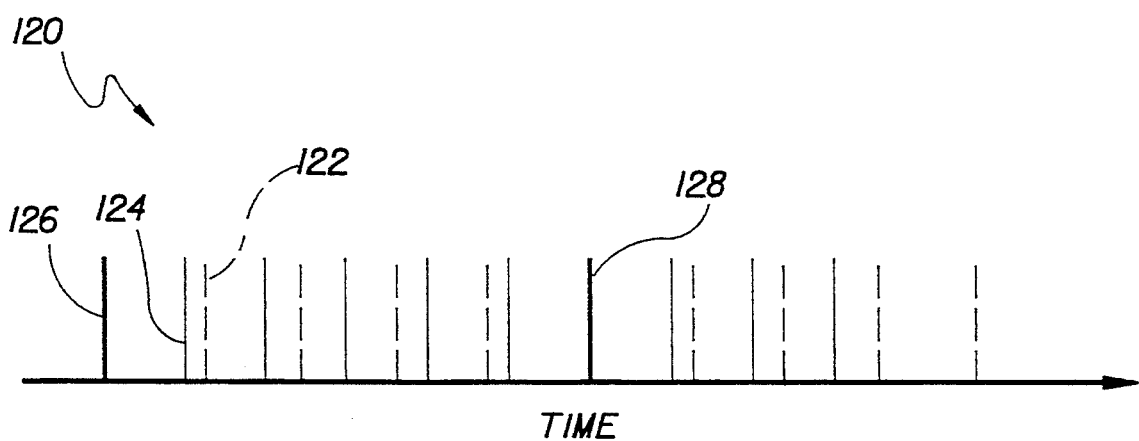
FIG. 6 is a light sample timing diagram for use with the line frequency determination circuitry of FIG. 1 according to a second method of the present invention.

FIG. 6 is a light sample timing diagram 120 that will be used to describe interleaved light sampling used in line frequency determination according to the second method of the present invention. Interleaved light sampling in this second method minimizes the number of samples that must be taken, as well as the time needed to take those samples. As with the first method, interleaved light sampling as described herein is most useful where only one A/D converter, such as A/D converter 22 in FIG. 1, is used for line frequency determination. The dashed lines in FIG. 6, e.g., line 122, represent samples in a sample group that will be compared to determine whether the presence of a 50 Hz line frequency is indicated. Similarly, the thin solid lines, e.g., line 124, represent samples in a sample group that will be compared to determine whether the presence of a 60 Hz line frequency is indicated. The thick solid lines 126 and 128 represent a single sample for both sample groups where the samples would otherwise coincide. This approach does not attempt to avoid samples coinciding, but uses such an occurrence to take a common sample for both groups and thereby minimize the number of samples that need to be taken. As with the first method, the 50 Hz sample group determines the overall time needed to take all the samples.

Figure 7:
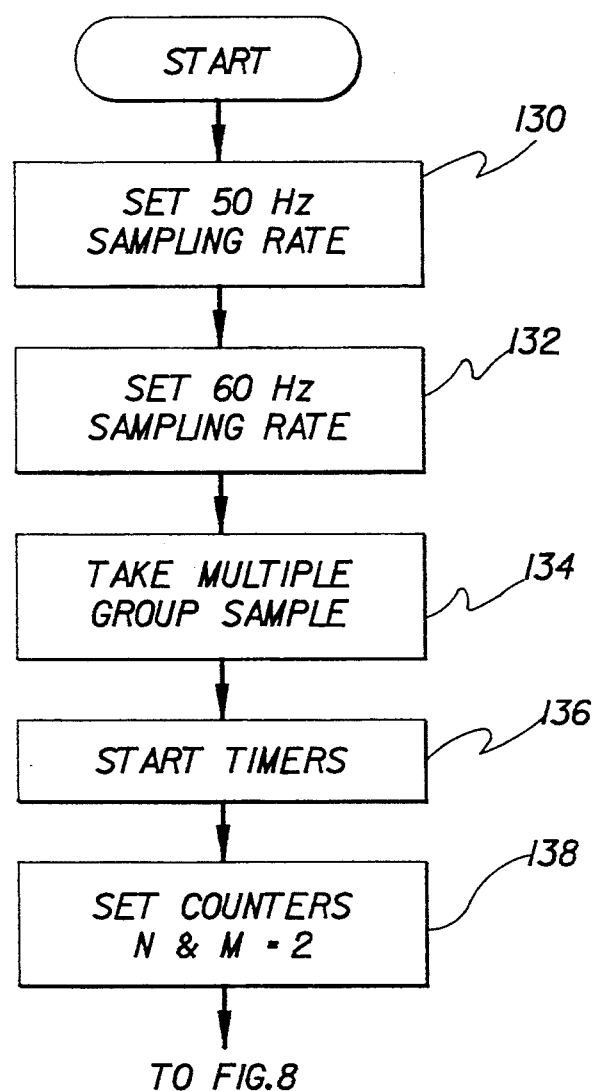
FIGS. 7 and 8 (incorporating the logic of FIG. 5) comprise a flow diagram depicting the second line frequency determination method for two possible line frequencies according to the present invention.
Figure 8:
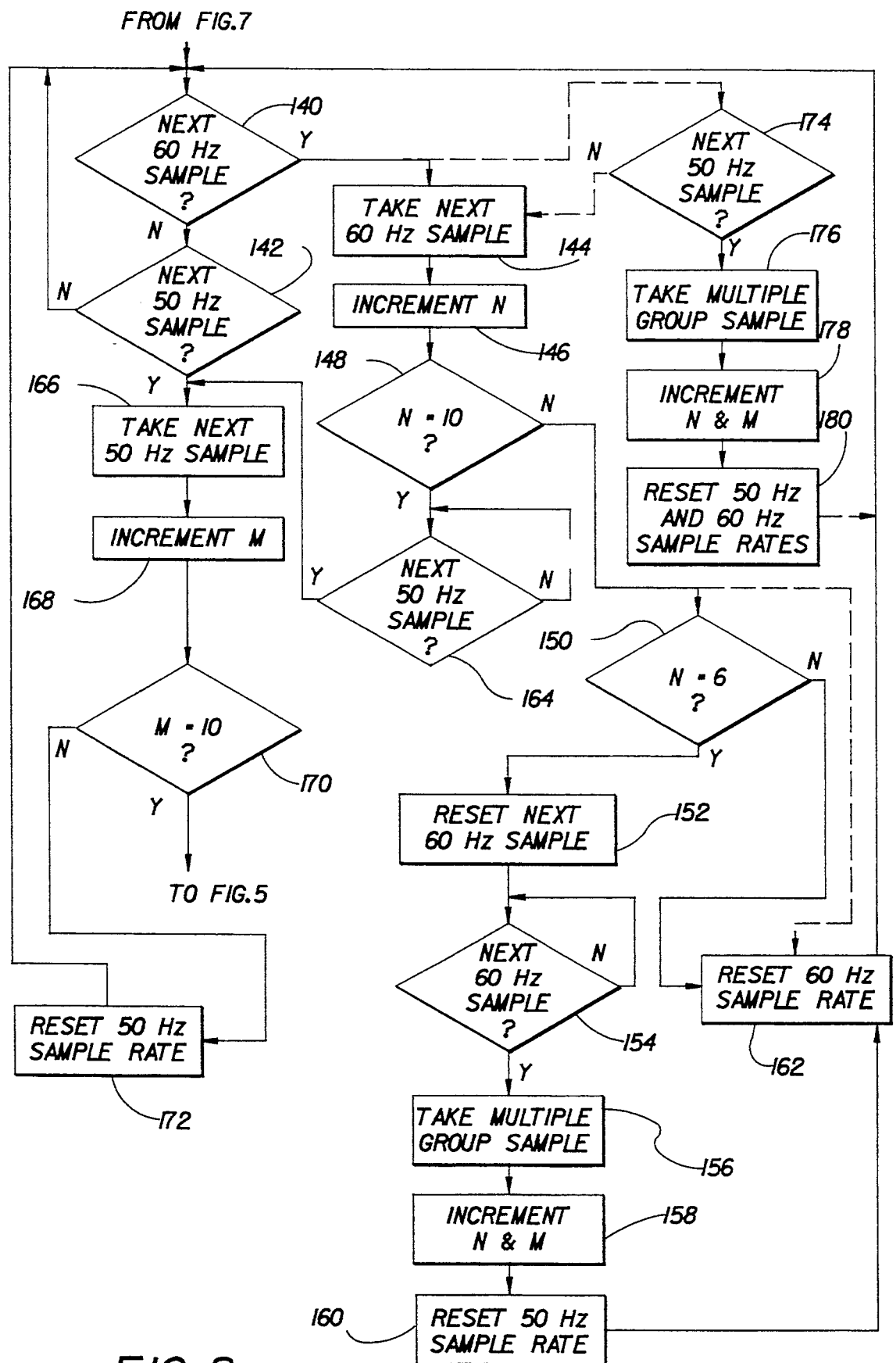

FIGS. 7 and 8, which incorporate the logic of FIG. 5, comprise a flow diagram describing the second method for determining a line frequency and a light source according to the present invention. This second method will be described with reference to line frequency determination circuitry 10 of FIG. 1. Initially, the sampling rates are set for the 50 Hz and 60 Hz sample groups by setting timer 32 to 1.25 ms and timer 30 to 1.04 ms, respectively (STEP 130 "SET 50 HZ SAMPLING RATE" and STEP 132 "SET 60 HZ SAMPLING RATE"). A single sample is then taken and converted; this single sample is then utilized as a first sample in both sample groups (STEP 134 "TAKE MULTIPLE GROUP SAMPLE"). Simultaneous with the taking of the first sample, timers 30 and 32 are started (STEP 136 "START TIMERS").

After the timers are started, counters 26 and 28 are initialized to 2 and started, with counter 26 (counter N in FIG. 8) associated with the 60 Hz sample group, and counter 28 (counter M in FIG. 8) associated with the 50 Hz sample group (STEP 138 "SET COUNTERS M & N=2"). After starting the counters, an inquiry is made as to whether timer 30 has timed out (INQUIRY 140 "NEXT 60 HZ SAMPLE?"). If timer 30 has not timed out, a second inquiry is made as to whether timer 32 has timed out (INQUIRY 142 "NEXT 50 HZ SAMPLE?"). If timer 32 has not yet timed out either, timeout inquiry loop 140, 142 is repeated until one of the timers has timed out.

If timer 30 has timed out, the next sample is taken and converted for the 60 Hz sample group (STEP 144 "TAKE NEXT 60 HZ SAMPLE"), and counter 26 is incremented (STEP 146 "INCREMENT N"). An inquiry is then made as to whether counter 26 has reached ten (INQUIRY 148 "N=10?"), in order to track when nine samples have been taken for the 60 Hz sample group. If counter 26 has not yet reached ten, a second inquiry is made as to whether counter 26 has reached six (INQUIRY 150 "N=6?"). Counter 26 reaching six is significant in this aspect of the second method, since it is known that the next 60 Hz sample (the seventh sample) will coincide with the next 50 Hz sample (the sixth sample). This knowledge regarding the samples coinciding is predetermined, for example, by setting up a time line such as that of FIG. 6, knowing how many samples will be taken. If counter 26 has reached six, timer 30 is reset for the 60 Hz sample time of 1.04 ms and started (STEP 152 "RESET 60 HZ SAMPLE RATE"). An inquiry is then made as to whether timer 30 has timed out and repeated until it has (INQUIRY 154 "NEXT 60 HZ SAMPLE?"). When timer 30 has timed out, a common sample is taken and converted for both the 50 Hz sample group and the 60 Hz sample group (STEP 156 "TAKE MULTIPLE GROUP SAMPLE"). After the common sample is taken and converted, counters 26 and 28 are both incremented (STEP 158 "INCREMENT M & N") and timers 30 and 32 are reset and started (STEP 160 "RESET 50 HZ SAMPLE RATE" and STEP 162 "RESET 60 HZ SAMPLE RATE"). If counter 26 has not yet reached six at INQUIRY 150, timer 30 would simply be reset and started, returning to inquiry 140 (STEP 162 "RESET 60 HZ SAMPLE RATE").

Returning to inquiry 148, if counter 26 (i.e., counter N) has reached ten, an inquiry is made as to whether the next 50 Hz sample should be taken (i.e., whether timer 32 had timed out (INQUIRY 164 "NEXT 50 HZ SAMPLE?"). INQUIRY 164 is repeated until timer 32 has timed out, whereupon the next 50 Hz sample is taken and converted (STEP 166 "TAKE NEXT 50 HZ SAMPLE") and counter 28 is incremented (STEP 168 "INCREMENT M"). An inquiry is then made as to whether counter 28 has reached ten (INQUIRY 170 "M=10?"). If counter 28 has not yet reached ten, timer 32 is reset to the 50 Hz sample rate and started (STEP 172 "RESET 50 HZ SAMPLE RATE"), returning to INQUIRY 140. If counter 28 has reached ten, the steps and inquiries as depicted in FIG. 5 and previously described are performed.

In a second aspect of the second method, the timers are tracked to determine when they time out simultaneously, rather than monitoring for predetermined samples just prior to multiple coinciding samples. The steps of this second aspect are depicted in FIG. 8 with dashed lines. If the result of INQUIRY 140 is positive, i.e., that it is time to take the next 60 Hz sample, a second inquiry is made as to whether the next 50 Hz sample should also be taken; in the present example, whether timer 32 has also timed out (INQUIRY 174 "NEXT 50 HZ SAMPLE?"). If timer 32 has not yet timed out, STEPS 144 and 146 are performed, rather than and then INQUIRY 148 is made. If the result of INQUIRY 148 is negative, STEP 162 is performed rather than INQUIRY 150, STEP 152, INQUIRY 154, and STEPs 156 through 160.

If the result of INQUIRY 174 is positive, i.e., that both timers have timed out, a common sample is taken and converted for both sample groups (STEP 176 "TAKE MULTIPLE GROUP SAMPLE). After the common sample is taken and converted, both counters are incremented (STEP 178 "INCREMENT N & M) and the timers are reset and started (STEP 180 "RESET 50 HZ AND 60 HZ SAMPLE RATES). INQUIRY 140 is then returned to.

Figure 9:
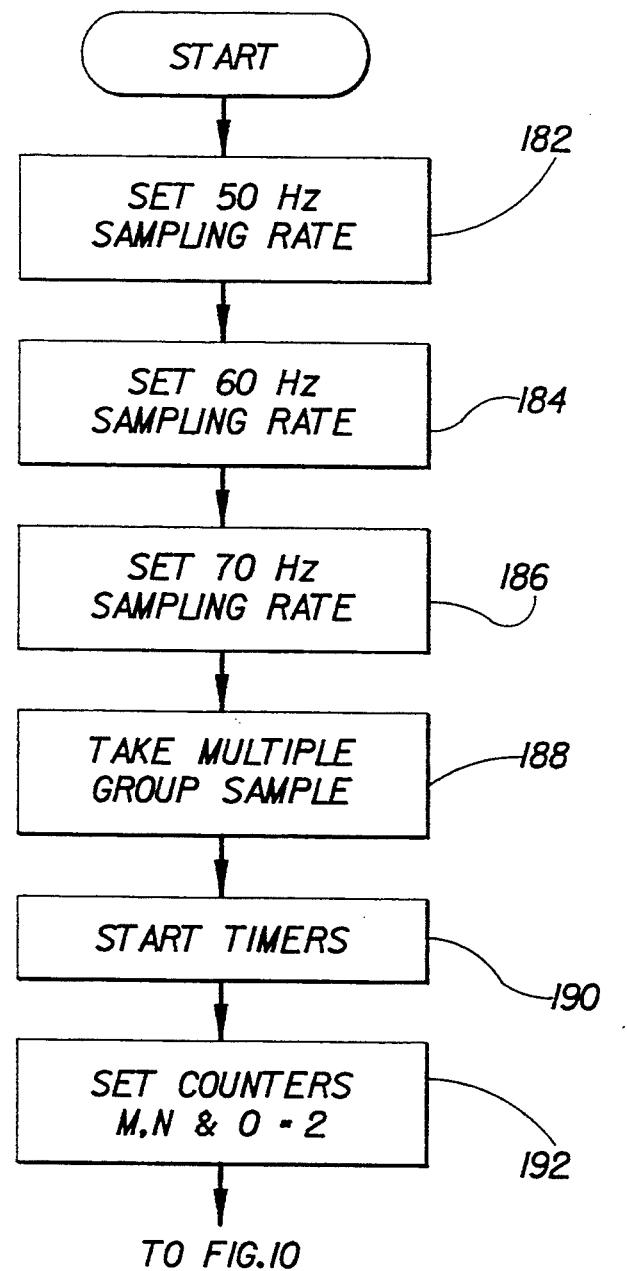
FIGS. 9, 10 and 11 comprise a flow diagram depicting the second method for three possible line frequencies according to a first aspect.
Figure 10:
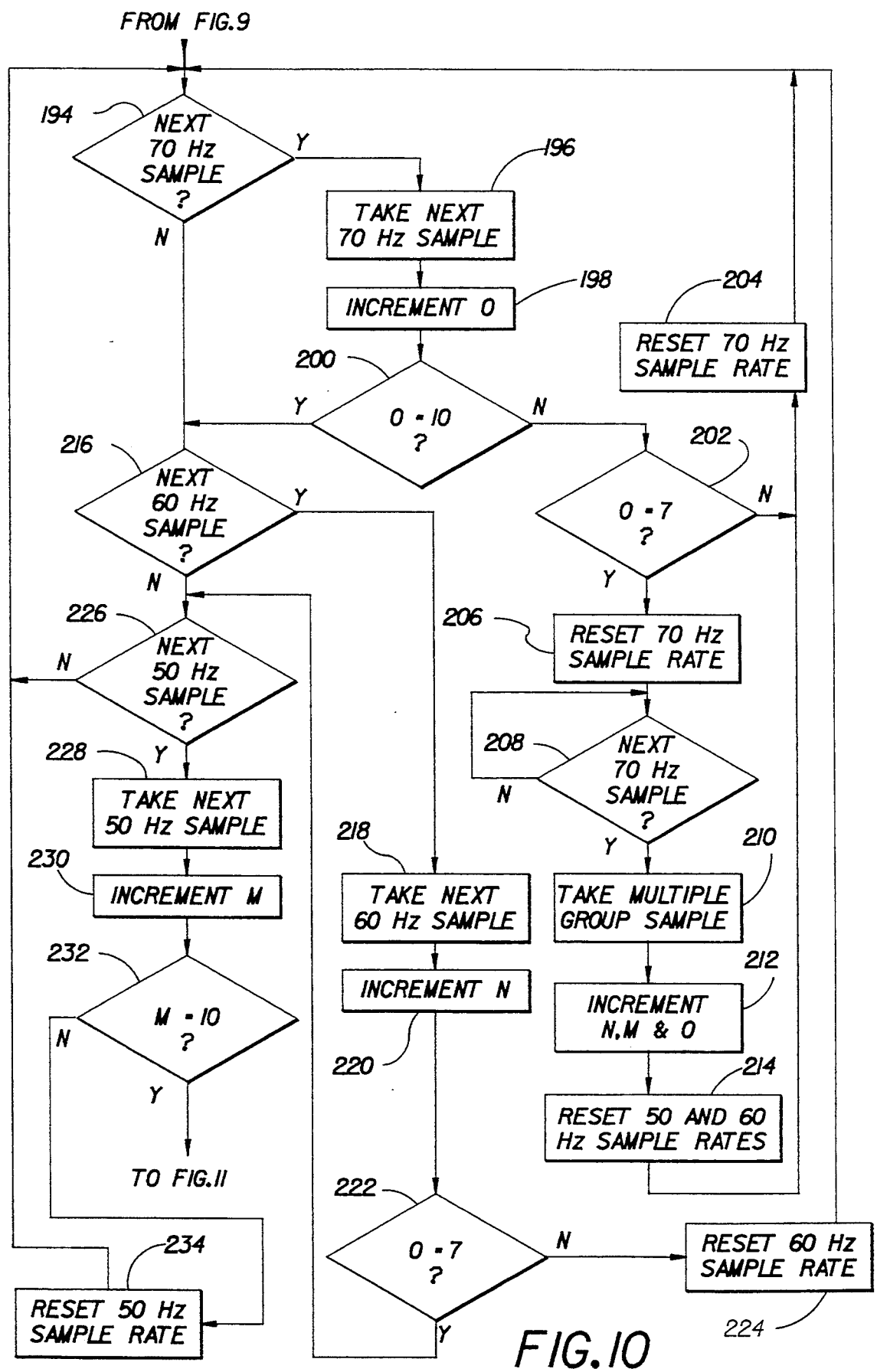
Figure 11:
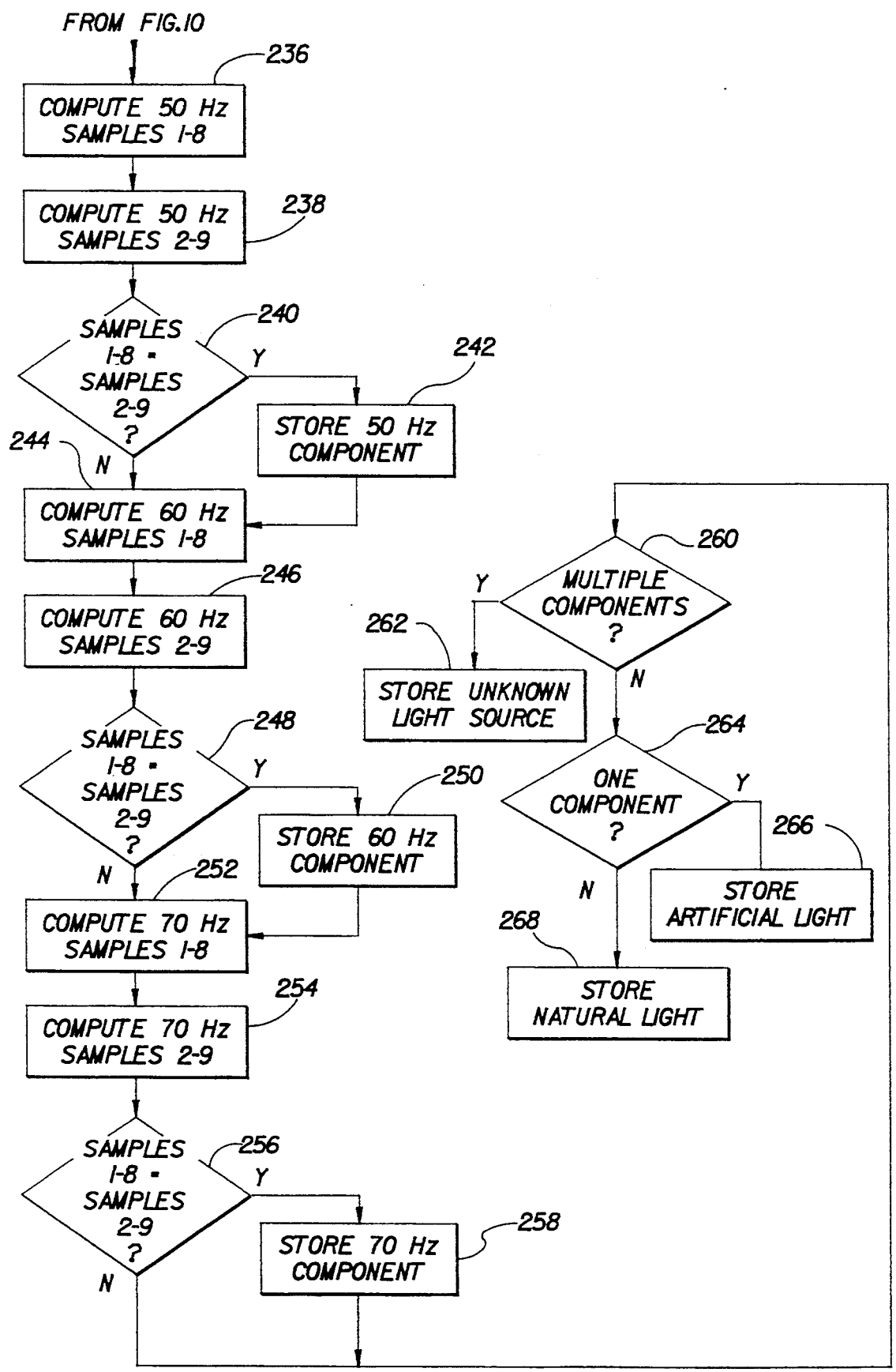

FIGS. 9-11 depict the logic of the first aspect of the second method given the case of three possible line frequencies—50, 60 and 70 Hz. TABLE 1 shown below lists sample times in milliseconds for ten samples associated with each of the three line frequencies. It will be understood that the method depicted in FIGS. 9-11 could be implemented using the circuitry of FIG. 1, with the addition of a third timer and a third counter. The sample times have been rounded to the second decimal place for purposes of description. It will also be understood that the accuracy of a sample time used in a given situation may differ. As can be seen in TABLE 1, a common sample time of 6.25 ms occurs for sample 6 of the 50 Hz sample group, sample 7 of the 60 Hz sample group and sample 8 of the 70 Hz sample group. Thus, a common sample could be taken at 6.25 ms and converted to digital form for use in all three line frequency group comparisons.

TABLE 1

| SAMPLE NUMBER | LINE FREQUENCY (HZ) | | |
|---|---|---|---|
| | 50 | 60 | 70 |
| | TIME (MS) | | |
| 1 | 0.00 | 0.00 | 0.00 |
| 2 | 1.25 | 1.04 | 0.89 |
| 3 | 2.50 | 2.08 | 1.79 |
| 4 | 3.75 | 3.13 | 2.68 |
| 5 | 5.00 | 4.17 | 3.57 |
| 6 | 6.25 | 5.21 | 4.46 |
| 7 | 7.50 | 6.25 | 5.36 |
| 8 | 8.75 | 7.29 | 6.25 |
| 9 | 10.00 | 8.33 | 7.14 |
| 10 | 11.25 | 9.38 | 8.04 |

Implemented with the above example, the first aspect of the second method begins by setting the timers for each line frequency group (STEP 182 "SET 50 HZ SAMPLING RATE", STEP 184 "SET 60 HZ SAMPLING RATE" and STEP 186 "SET 70 HZ SAMPLING RATE"). Simultaneously, a multiple group sample is taken and the timers are all started (STEP 188 "TAKE MULTIPLE GROUP SAMPLE" and STEP 190 "START TIMERS"). The counters for tracking the sample numbers are also initialized to two and started (STEP 192 "SET COUNTERS M, N & O=2"), with counter M being associated with the 50 Hz sample group, counter N with the 60 Hz sample group and counter 0 with the 70 Hz sample group.

After the counters are initialized and started, an inquiry is made as to whether the 70 Hz timer has timed out (INQUIRY 194 "NEXT 70 HZ SAMPLE?"). If the 70 Hz timer had timed out, the next 70 Hz sample would be taken and the associated counter incremented (STEP 196 "TAKE NEXT 70 HZ SAMPLE" and STEP 198 "INCREMENT O"). An inquiry is then made as to whether the 70 Hz sample counter has reached 10 (INQUIRY 200 "O=10?"). Note that the highest frequency is dealt with first, since the highest frequency has the shortest sample time and the chosen number of samples will be reached for that frequency first. As will be described in greater detail, an inquiry regarding whether the chosen number of samples has been reached is made in descending order with respect to frequency. If the 70 Hz sample counter has reached ten, the steps after a negative result from INQUIRY 194, which will subsequently be described in detail, are followed. If the 70 Hz sample counter has not yet reached ten, a second inquiry is made as to whether it has reached seven, since the eighth 70 Hz sample will be a common sample (INQUIRY 202 "O=7?"). If the 70 Hz sample counter has not yet reached seven, the 70 Hz timer is reset and started (STEP 204 "RESET 70 HZ SAMPLE RATE"), returning to INQUIRY 194. If the 70 Hz sample counter has reached seven, the 70 Hz sample timer is reset and started and a wait state is entered until it has timed out (STEP 206 "RESET 70 HZ SAMPLE RATE" and INQUIRY 208 "NEXT 70 HZ SAMPLE?"). Once the 70 Hz sample timer has timed out, a common sample for all three sample groups is taken and converted (STEP 210 "TAKE MULTIPLE GROUP SAMPLE"). After the common sample is taken and converted, all the counters are incremented (STEP 212 "INCREMENT N, M & O") and all the timers are simultaneously reset and started (STEP 214 "RESET 50 AND 60 HZ SAMPLE RATES" in conjunction with STEP 204 "RESET 70 HZ SAMPLE RATE").

If the initial inquiry as to whether the 70 Hz timer had timed out (INQUIRY 194) yields a negative result, an inquiry is made as to whether the 60 Hz sample timer has timed out (INQUIRY 216 "NEXT 60 HZ SAMPLE?"). If the 60 Hz sample timer has timed out, the next 60 Hz sample is taken and the 60 Hz sample counter is incremented (STEP 218 "TAKE NEXT 60 HZ SAMPLE" and STEP 220 "INCREMENT N"). After incrementing the 60 Hz sample counter, an inquiry is made as to whether it has reached ten (INQUIRY 222 "N=10?"). Recall that the significance of the counters reaching ten is that nine samples for each group are preferably taken. If the 60 Hz sample counter has not yet reached ten, the 60 Hz sample timer is reset and started (STEP 224 "RESET 60 HZ SAMPLE RATE"), returning to INQUIRY 194.

If the 60 Hz sample counter has reached ten (INQUIRY 222), an inquiry is made as to whether the 50 Hz sample timer has timed out (INQUIRY 226 "NEXT 50 HZ SAMPLE?"). If the 50 Hz sample timer has not timed out, INQUIRY 194 is returned to. If the 50 Hz sample timer has timed out, the next 50 Hz sample is taken and converted (STEP 228 "TAKE NEXT 50 HZ SAMPLE"), and the 50 Hz sample counter is incremented (STEP 230 "INCREMENT M"). An inquiry is then made as to whether the 50 Hz sample counter has reached ten (INQUIRY 232 "M=10?"). If the 50 Hz sample counter has not yet reached ten, the 50 Hz sample timer is reset and started (STEP 234 "RESET 50 HZ SAMPLE RATE"), and INQUIRY 194 is returned to. If the 50 Hz sample counter has reached ten, the samples have all been taken, since 50 Hz is the lowest frequency and therefore it will take the longest time to obtain a given number of samples therefor.

If all the samples have been taken, i.e., the 50 Hz sample counter has reached ten, the logic of the comparison method described with reference to FIG. 5 is followed with the addition of the 70 Hz sample group. That is, steps similar to 94–100, including INQUIRY 98, are performed for the 70 Hz sample group as well (shown in FIG. 11 as STEPS 252, 254, 258 and INQUIRY 256). After the comparisons have been made for each sample group and the presence of one or more of the possible line frequencies has been determined, an inquiry is made as to whether a presence of multiple line frequencies have been determined (INQUIRY 260 "MULTIPLE COMPONENTS?"). If multiple line frequencies have been determined, an indication of an unknown light source is stored in the microcontroller memory (STEP 262 "STORE UNKNOWN LIGHT SOURCE"). If the presence of multiple line frequencies is not indicated, an inquiry is made as to whether a single line frequency is indicated (INQUIRY 264 "ONE COMPONENT?"). If the presence of a single line frequency is indicated, an indication of artificial light is stored in the microcontroller memory (STEP 266 "STORE ARTIFICIAL LIGHT"). Note that the teachings of the Gaboury patent (U.S. Pat. No. 5,037,198) could be used at this point to further determine the type of artificial lighting present. If none of the possible line frequencies was indicated, i.e., a single component was not found, an indication of natural lighting is stored in the microcontroller memory (STEP 268 "STORE NATURAL LIGHT").

Figure 12:
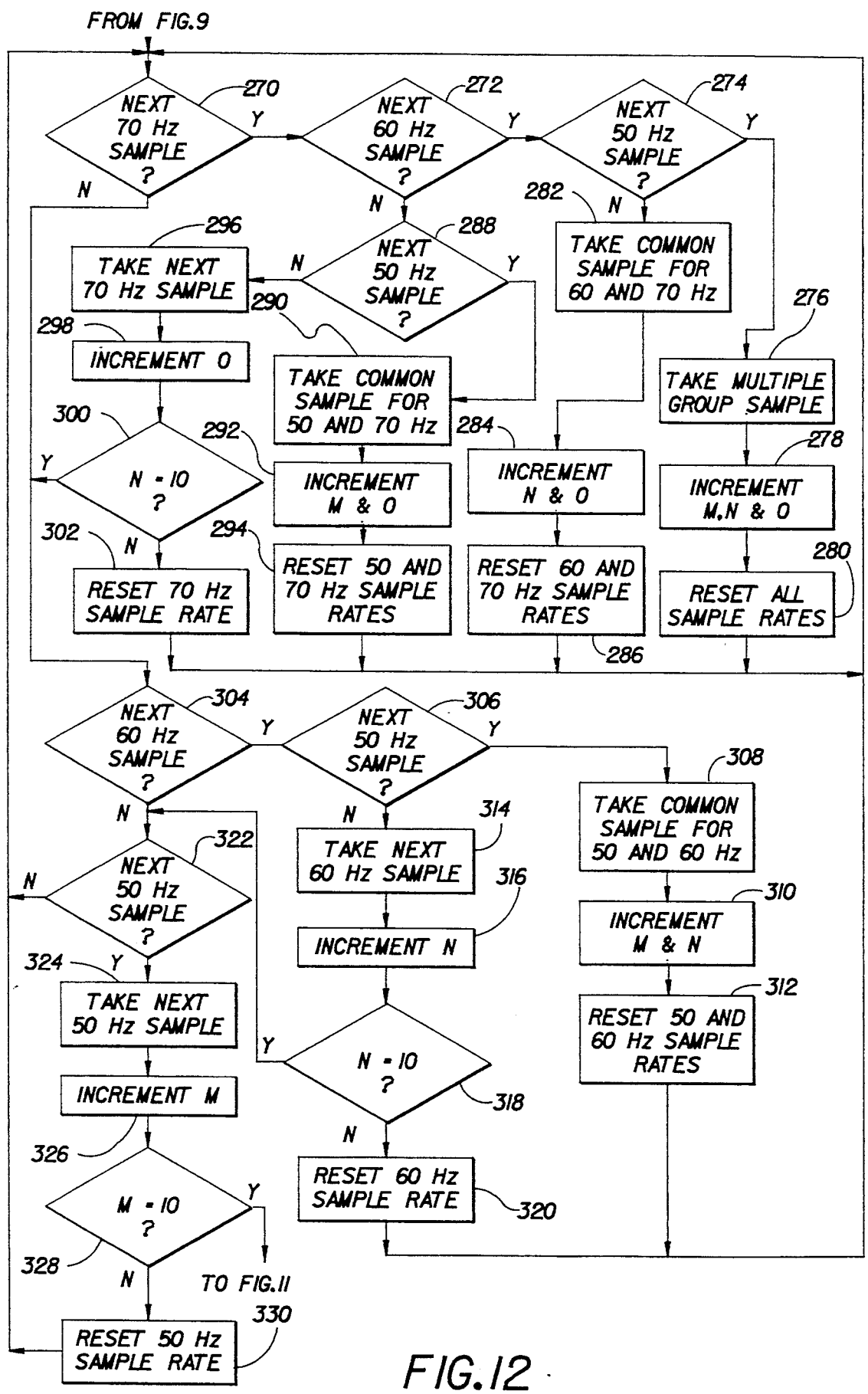
FIG. 12 (incorporating the logic of FIGS. 9 and 11) comprises a flow diagram depicting the second method for three possible line frequencies according to a second aspect.

FIG. 12, which incorporates the logic of FIGS. 9 and 11, depicts the logic of the second aspect of the second method where there are three possible line frequencies—50, 60 and 70 Hz. After the steps as depicted in FIG. 9 are followed, an inquiry is made as to whether the 70 Hz sample timer has timed out (INQUIRY 270 "NEXT 70 HZ SAMPLE?"). If the 70 Hz sample timer has timed out, a second inquiry is made as to whether the 60 Hz sample timer has timed out (INQUIRY 272 "NEXT 60 HZ SAMPLE?"). If the 60 Hz sample timer has also timed out, a third inquiry is made as to whether the 50 Hz sample timer has timed out (INQUIRY 274 "NEXT 50 HZ SAMPLE?"). If the 50 Hz sample timer has also timed out, a common sample is taken and converted for the 50, 60 and 70 Hz sample groups (STEP 276 "TAKE MULTIPLE GROUP SAMPLE"). After the common sample is taken and converted, all the sample counters are incremented and all the sample timers are reset and started (STEP 278 "INCREMENT M, N & O" and STEP 280 "RESET ALL SAMPLE RATES"), returning to INQUIRY 270.

If the result of INQUIRY 274 is negative, i.e., the 60 and 70 Hz sample timers have timed out, but the 50 Hz sample timer has not, a common sample is taken for the 60 and 70 Hz sample groups (STEP 282 "TAKE COMMON SAMPLE FOR 60 AND 70 HZ"). After the 60 and 70 Hz common sample is taken, the sample counters associated therewith are incremented (STEP 284 "INCREMENT N AND O") the 60 and 70 Hz sample timers are both reset and started (STEP 286 "RESET 60 AND 70 HZ SAMPLE RATES") and INQUIRY 270 is returned to.

If the result of INQUIRY 272 is negative, i.e., the 70 Hz sample timer has timed out, but the 60 Hz sample timer has not, an inquiry is made as to whether the 50 hz sample timer has timed out (INQUIRY 288 "NEXT 50 HZ SAMPLE?"). If the 50 Hz sample timer has timed out, a common sample is taken and converted for the 50 and 70 Hz sample groups (STEP 290 "TAKE COMMON SAMPLE FOR 50 AND 70 HZ"). After the common 50 and 70 Hz sample has been taken and converted, the 50 and 70 Hz sample counters are incremented (STEP 292 "INCREMENT M AND O") and the 50 and 70 Hz sample timers are reset and started (STEP 294 "RESET 50 AND 70 HZ SAMPLE RATES").

If the result of INQUIRY 288 is negative, i.e., only the 70 Hz sample timer has timed out, the next sample is taken and converted for the 70 hz sample group (STEP 296 "TAKE NEXT 70 HZ SAMPLE") and the 70 Hz sample counter is incremented (STEP 298 "INCREMENT O"). An inquiry is then made as to whether the 70 Hz sample counter has reached ten (INQUIRY 300 "O=10?"). If the 70 Hz sample counter has not yet reached ten, the 70 Hz sample timer is reset and started (STEP 302 "RESET 70 HZ SAMPLE RATE"), then returning to INQUIRY 270.

If the result of INQUIRY 270 is negative, i.e., the 70 Hz sample timer has not yet timed out, an inquiry is made as to whether the 60 Hz sample timer has timed out (STEP 304 "NEXT 60 HZ SAMPLE?"). If the 60 Hz sample timer has timed out, a second inquiry is made as to whether the 50 Hz sample timer has timed out (INQUIRY 306 "NEXT 50 HZ SAMPLE?"). If the 50 Hz sample timer has timed out as well, a common sample is taken and converted for the 50 and 60 Hz sample groups (STEP 308 "TAKE COMMON SAMPLE FOR 50 AND 60 HZ"). After the common 50 and 60 Hz sample is taken and converted, the 50 and 60 Hz sample counters are incremented (STEP 310 "INCREMENT N AND M) and the 50 and 60 Hz sample timers are reset and started (STEP 312 "RESET 50 AND 60 HZ SAMPLE RATES"), the method returning to INQUIRY 270.

If the result of INQUIRY 306 is negative, i.e., that only the 60 Hz sample timer had timed out, the next sample is taken for the 60 Hz sample group (STEP 314 "TAKE NEXT 60 HZ SAMPLE") and the 60 Hz sample counter is incremented (STEP 316 "INCREMENT N"). An inquiry is then made as to whether the 60 Hz sample counter has reached ten (INQUIRY 318 "N=10?"). If the 60 Hz sample counter has not yet reached ten, the 60 Hz sample timer is reset and started (STEP 320 "RESET 60 HZ SAMPLE RATE"), then returning to INQUIRY 270.

If the 60 Hz sample counter has reached ten or the result of INQUIRY 304 is negative (i.e., the 60 Hz sample timer has not yet timed out), an inquiry is made as to whether the 50 Hz sample timer has timed out (INQUIRY 322 "NEXT 50 HZ SAMPLE?"). If the 50 Hz sample timer has not timed out, INQUIRY 270 is returned to. If the 50 Hz sample timer has timed out, the next 50 Hz sample is taken and converted (STEP 324 "TAKE NEXT 50 HZ SAMPLE") and the 50 Hz sample counter is incremented (STEP 326 "INCREMENT M"). An inquiry is then made as to whether the 50 Hz sample counter has reached ten (INQUIRY 328 "M=10?"). If the 50 Hz sample counter has reached ten, the steps and inquiries as depicted in FIG. 11 and previously described are followed. If the 50 Hz sample counter has not yet reached ten, the 50 Hz sample timer is reset and started (STEP 330 "RESET 50 HZ SAMPLE RATE"), after which INQUIRY 270 is returned to.

Figure 13:
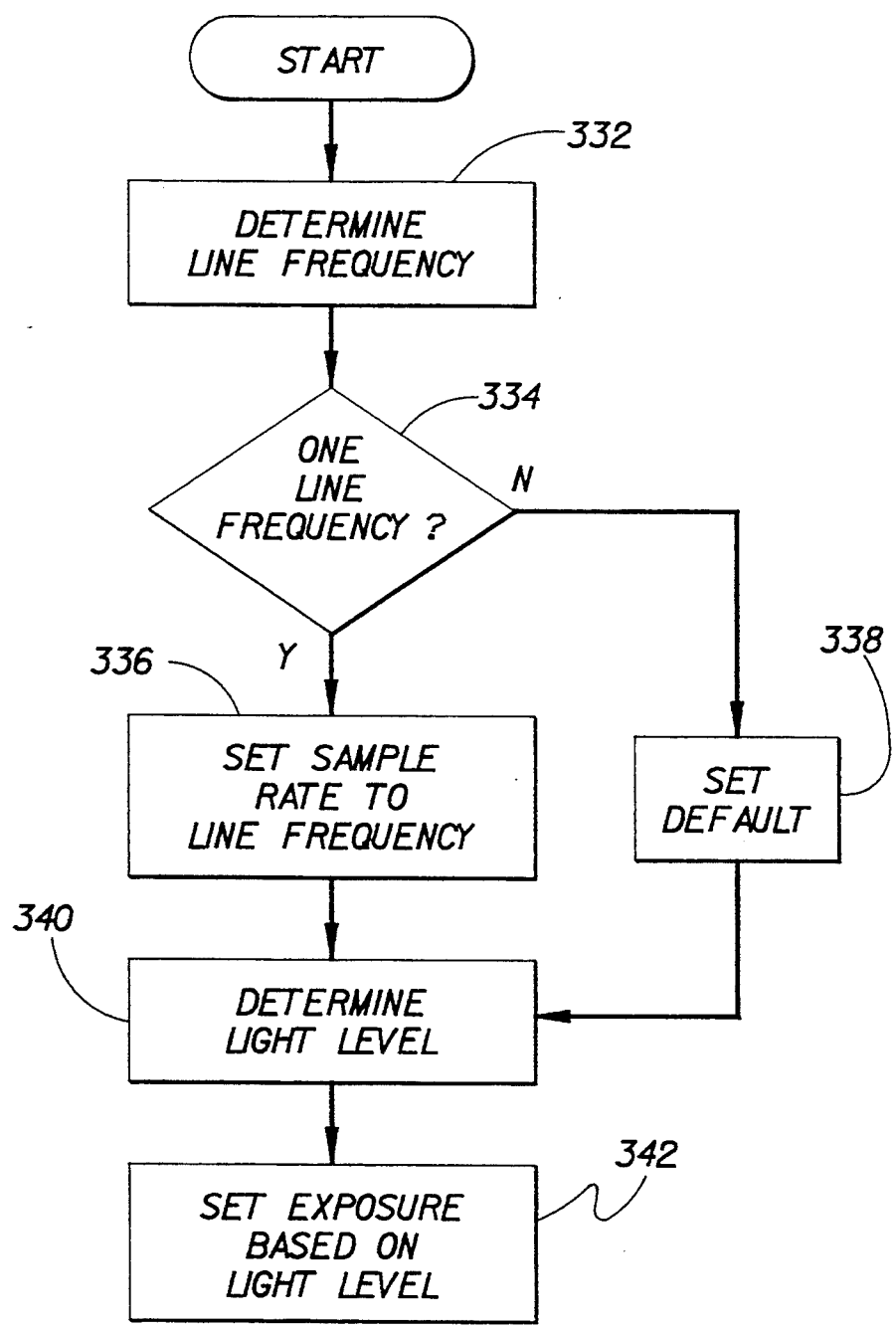
FIG. 13 is a flow diagram depicting a method for automatic camera exposure setting based on determined line frequency according to the present invention.

A method for automatic camera exposure setting using line frequency information will now be described with reference to FIG. 13. Initially, light samples are taken to determine whether the presence of one, more than one or no line frequency from a group of possible line frequencies was indicated (STEP 332 "DETERMINE LINE FREQUENCY"). The methods previously described for determining line frequency are useful in this regard. An initial inquiry is then made to determine whether the presence of a single line frequency was indicated (STEP 334 "ONE LINE FREQUENCY?"). If only a single line frequency was indicated, the sample rate for determining light level is set to correspond to the line frequency indicated (STEP 336 "SET SAMPLE RATE TO LINE FREQUENCY"). If something other than a single line frequency was indicated, a default sample rate is set (STEP 338 "SET DEFAULT"). Whatever the light level sample rate is set to, the light level must then be determined (STEP 340 "DETERMINE LIGHT LEVEL"). Various schemes exist in the art to determine light level. Once the light level is determined, the exposure is automatically set based on the determined light level (STEP 342 "SET EXPOSURE BASED ON LIGHT LEVEL").

Having line frequency information is also helpful in communicating light source information to the film developer. This can be done by imprinting the information directly onto the film when the photograph is taken by, for example, imprinting an optically viewable message onto the film readily discernable by the film developer. The imprinted message could also be, as a further example, a machine-readable message not readily discernable by the human film developer. In addition, the imprinted message could be stored on a magnetic medium on the film or associated therewith. One such scheme is presented in U.S. Pat. No. 5,016,030 issued to Dwyer et al., entitled "Apparatus for Magnetically Reading and Recording on Film" and assigned to the Eastman Kodak Company, which is herein incorporated by reference in its entirety.

Figure 14:
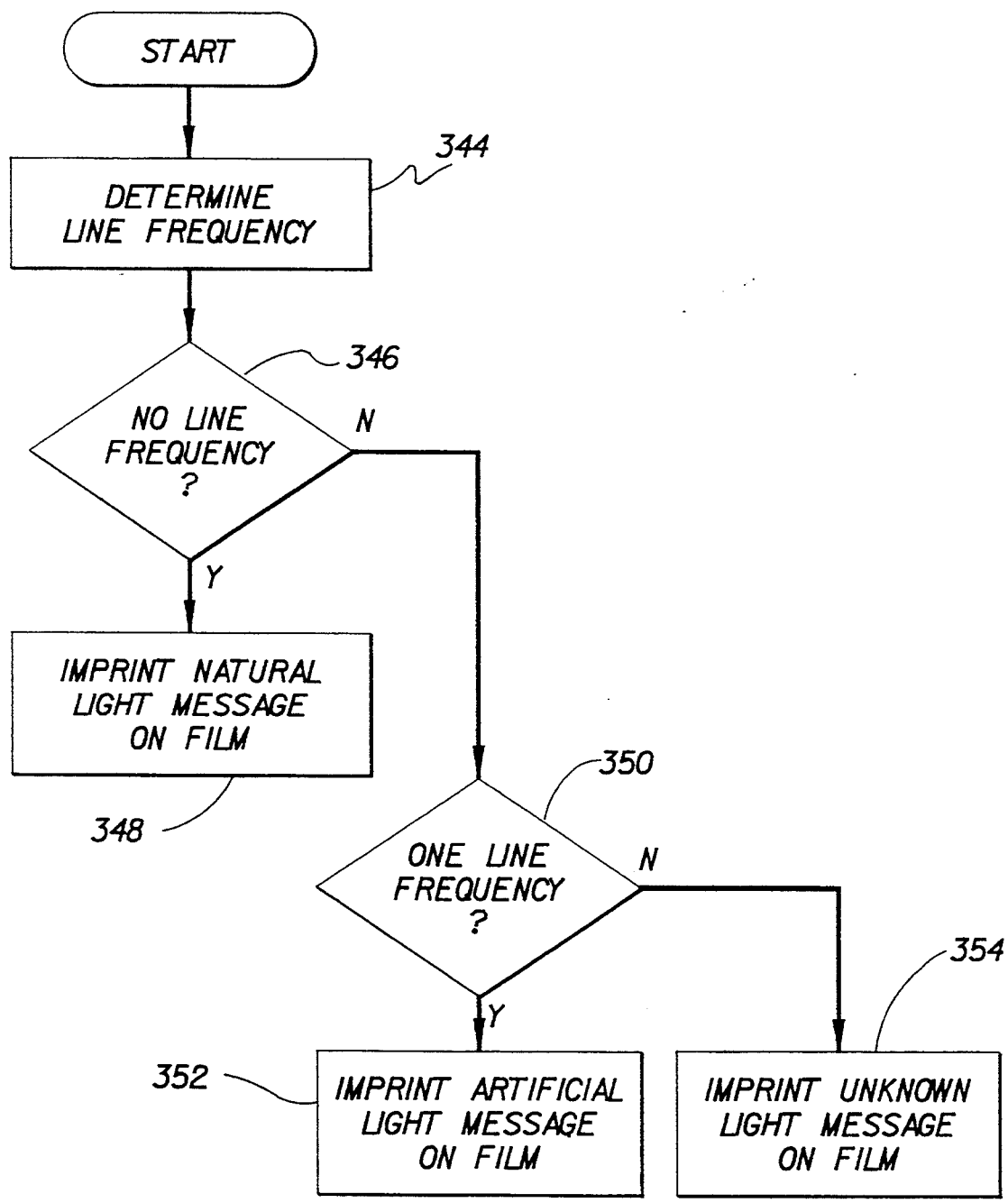
FIG. 14 is a flow diagram depicting a method for automatic imprinting of light source information on photographic film based on determined line frequency according to the present invention.

FIG. 14 is a flow diagram depicting a method for automatic camera imprinting of light source information onto photographic film. Initially, it is determined whether the presence of one, more than one or no line frequency is indicated (STEP 344 "DETERMINE LINE FREQUENCY"). The previously described methods for such determinations are useful in this regard. Once the line frequency is determined, an inquiry is made as to whether the presence of no line frequency was indicated (INQUIRY 346 "NO LINE FREQUENCY?"). If the presence of no line frequency was indicated, a message is imprinted onto the film indicating the presence of natural lighting (STEP 348 "IMPRINT NATURAL LIGHT MESSAGE ON FILM"). If the result of INQUIRY 346 is negative, a second inquiry is made as to whether the presence of a single line frequency was indicated (INQUIRY 350 "ONE LINE FREQUENCY?"). If the presence of only a single line frequency was indicated, a message indicating the presence of artificial lighting is imprinted onto the film (STEP 352 "IMPRINT ARTIFICIAL LIGHT MESSAGE ON FILM"). If the result of INQUIRY 350 is negative, then it must be the case that the presence of more than one line frequency was indicated, and a message indicating the presence of an unknown or mixed light source is imprinted onto the film (STEP 354 "IMPRINT UNKNOWN LIGHT MESSAGE ON FILM"). It will be understood that the inquiries regarding whether the presence of one, more than one or no line frequency was indicated could be done in any order, and only two out of the three need actually be inquired about directly, the final inquiry being answered by default.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A method for determining the presence of a line frequency from a group of possible line frequencies, said group of possible line frequencies comprising a first line frequency having an associated first flicker frequency period and a second line frequency having an associated second flicker frequency period, said first line frequency being lower than said second line frequency, said method comprising the steps of:

sampling ambient light to obtain a first analog voltage sample representative of ambient light level for a first sample group and converting same to a digital value, wherein said first sample group corresponds to said first line frequency and consecutive analog voltage samples for said first sample group are taken at a first sample rate;

sampling said ambient light to obtain a first analog voltage sample representative of ambient light level for a second sample group after a predetermined time from said first analog voltage sample of said first sample group and converting same to a digital value, wherein said second sample group corresponds to said second line frequency and consecutive analog voltage samples for said second sample group are taken at a second sample rate, said first sample rate and said second sample rate being defined by the following:

sample rate = $1/(f_f \times n)$, where $f_f$ = flicker frequency in Hertz, and n = number of samples per flicker frequency period, and wherein said predetermined time is at least equal to a time required for said converting and less than a shortest time wherein a future sample for said first sample group would coincide with a future sample for said second sample group;

sampling said ambient light at said first sample rate to obtain a second analog voltage sample for said first sample group and converting same to a digital value;

sampling said ambient light at said second sample rate to obtain a second analog voltage sample for said second sample group and converting same to a digital value;

repeating said steps of sampling and converting for said first sample group and said second sample group until a predetermined number of samples Q are taken and converted therefor; and comparing converted samples in at least one sample group to determine if a presence of said line frequency is indicated.

2. The line frequency determination method of claim 1 wherein said step of comparing comprises:

comparing converted samples in said first sample group to determine if a presence of said first line frequency is indicated; and comparing converted samples in said second sample group to determine if a presence of said second line frequency is indicated.

3. The line frequency determination method of claim 1, wherein $Q \geq 5$, wherein said step of comparing comprises comparing a first value derived from converted samples one through Q-1 of said at least one sample group to a second value derived from converted samples two through Q of said at least one sample group to determine if said first value is within a predetermined limit of said second value, said first value being within said predetermined limit of said second value indicating a presence of said associated line frequency.

4. The line frequency determination method of claim 3 wherein Q=9.

5. A method for determining the presence of a line frequency from at least two possible line frequencies, each line frequency having an associated flicker frequency period, said method comprising the steps of:

sampling ambient light to obtain a common first analog voltage sample representative of ambient light level and converting same to a digital value for at least two sample groups, each of said at least two sample groups being associated with a different one of said at least two possible line frequencies, wherein consecutive samples for a given one of said at least two sample groups are taken at a sample rate defined by the following:

sample rate = $1/(f_f \times n)$, where $f_f$ = flicker frequency in Hertz, and n = number of samples per flicker frequency period;

repeatedly sampling ambient light to obtain analog voltage samples representative of ambient light level and converting same to digital values for each of said at least two sample groups at the respective sample rate until a predetermined number of samples Q are taken and converted therefor;

determining a presence of a condition characterized by said sampling for more than one of said at least two sample groups coinciding;

sampling said ambient light to obtain a common analog voltage sample and converting same to a digital value for each of said at least two sample groups in response to said determined presence of said condition; and comparing converted samples in at least one sample group to determine if a presence of said associated line frequency is indicated.

6. The line frequency determination method of claim 5, wherein Q≧5, wherein said step of comparing comprises comparing a first value derived from converted samples one through Q-1 of said at least one sample group to a second value derived from converted samples two through Q of said at least one sample group to determine if said first value is within a predetermined limit of said second value, said first value being within said predetermined limit of said second value indicating a presence of said associated line frequency.

7. The line frequency determination method of claim 6 wherein Q=9.

8. The line frequency determination method of claim 5, wherein said step of determining comprises predetermining an ambient light sample to be taken just prior to said condition.

9. The line frequency determination method of claim 5, wherein said step of determining comprises predetermining a time when said condition will be present.

10. The line frequency determination method of claim 5 wherein said step of determining comprises determining a presence of a condition characterized by a time between consecutive samples for more than one of said at least two sample groups expiring simultaneously.

11. A method for camera automatic exposure setting, said method comprising the steps of:

camera automatic sampling of ambient light for determining whether the presence of one, more than one or no line frequency from a group of possible line frequencies is indicated;

camera automatic sampling of said ambient light for determining ambient light level at a sampling rate directly related to said one determined line frequency if a presence of said one line frequency is indicated, said sampling rate being a predetermined default sampling rate if a presence of said more than one line frequency or said no line frequency is indicated; and camera automatic setting of said exposure based on said determined ambient light level.

12. A method for camera automatic imprinting of light source information on photographic film, comprising the steps of:

camera automatic sampling of ambient light for determining whether the presence of one, more than one or no line frequency from a group of possible line frequencies is indicated; and camera automatic imprinting of a light source message on said photographic film when a photograph is taken, said light source message indicating an artificial light source if the presence of said one line frequency is indicated, a natural light source if the presence of said no line frequency is indicated and an unknown light source if the presence of said more than one line frequency is indicated.

13. The method of claim 12 wherein said step of camera automatic imprinting comprises imprinting a visually perceptible light source message readily discernable by a human.

14. The method of claim 12 wherein said step of camera automatic imprinting comprises imprinting a machine-readable light source message not readily discernable by a human.

15. The method of claim 14 wherein said step of camera automatic imprinting comprises storing said machine-readable light source message on a magnetic medium associated with said photographic film.

16. A line frequency determination device for determining the presence of a line frequency from a group of possible line frequencies, said group of possible line frequencies comprising a first line frequency having an associated first flicker frequency period and a second line frequency having an associated second flicker frequency period, said device comprising:

means for sampling ambient light, each sample being associated with a sample group corresponding to one of said group of possible line frequencies, wherein consecutive samples in a given sample group are taken at a sample rate defined by the following:

sample rate = $1/(f_f \times n)$, where $f_f$ = flicker frequency in Hertz, and n = number of samples per flicker frequency period, and wherein consecutive samples for different sample groups are interleaved;

means for generating an analog voltage sample representative of ambient light level;

means for converting said generated analog voltage sample to a digital sample, said converting means requiring a conversion time for converting a given analog voltage sample;

means for staggering for a predetermined time a first sample for a first sample group corresponding to said first line frequency and a first sample for a second sample group corresponding to said second line frequency, wherein said predetermined time is at least equal to said conversion time and less than a shortest time where a future sample for said first sample group would coincide with a future sample for said second sample group; and means for comparing digital samples to determine if a presence of a given line frequency is indicated.

17. The line frequency determination device of claim 16, wherein said sampling means and said generating means comprises a photometer.

18. The line frequency determination device of claim 16, wherein said converting means comprises an analog-to-digital converter.

19. The line frequency determination device of claim 16, wherein said staggering means comprises a timer.

20. The line frequency determination device of claim 16, wherein said comparing means comprises an integrated circuit.

21. The line frequency determination device of claim 16, wherein said converting means, said staggering means and said comparing means comprises an appropriately programmed general purpose microcontroller.

22. The line frequency determination device of claim 16, wherein said converting means, said staggering means and said comparing means comprises an application specific integrated circuit.

23. A line frequency determination device for determining the presence of a line frequency from at least two possible line frequencies, each of said at least two possible line frequencies having an associated flicker frequency period, said device comprising:

means for sampling ambient light, each sample being associated with one or more sample groups, each sample group corresponding to a different one of said at least two possible line frequencies, wherein consecutive samples in a given sample group are taken at a sample rate defined by the following:

sample rate=$1/(f_f \times n)$, where $f_f$=flicker frequency in Hertz, and n=number of samples per flicker frequency period, and wherein consecutive samples for different sample groups are interleaved;

means for generating an analog voltage sample representative of ambient light level;

means for converting said generated analog voltage sample to a digital sample;

means for determining the presence of a condition characterized by simultaneous ambient light sampling for more than one sample group;

means for generating a common analog voltage sample for said more than one sample group in response to said determined presence of said condition; and means for comparing digital samples to determine if a presence of a given line frequency is indicated.

24. The line frequency determination device of claim 23, Wherein said sampling means, said analog voltage sample generating means and said common analog voltage sample generating means comprises a photometer.

25. The line frequency determination device of claim 23, wherein said converting means comprises an analog-to-digital converter.

26. The line frequency determination device of claim 23, wherein said determining means comprises an integrated circuit.

27. The line frequency determination device of claim 23, wherein said comparing means comprises an integrated circuit.

28. The line frequency determination device of claim 23, wherein said converting means, said determining means and said comparing means comprises an appropriately programmed general purpose microcontroller.

29. The line frequency determination device of claim 23, wherein said converting means, said determining means and said comparing means comprises an application specific integrated circuit.

* * * * *